No. 681,489. Patented Aug. 27, 1901.
W. VOSS.
AUTOMATIC BRAKE.
(Application filed Feb. 23, 1901.)
(No Model.) 2 Sheets—Sheet 1.
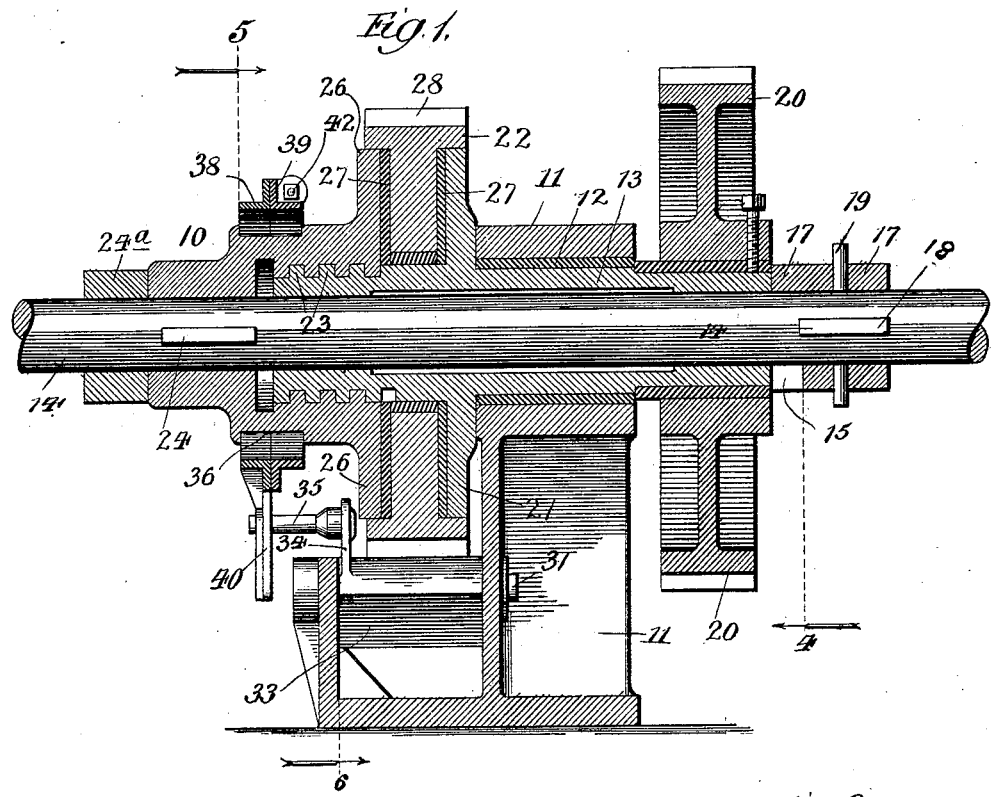
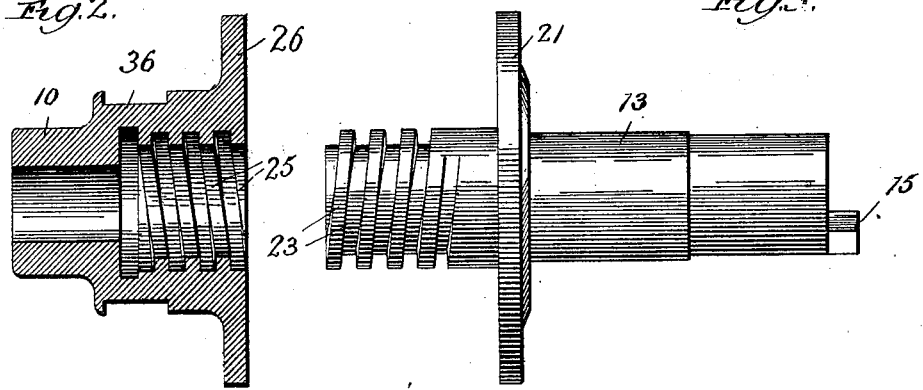
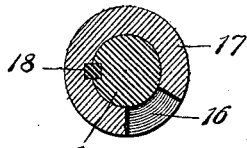
Witnesses:
Inventor:
William Voss,
By Dwight B. Cheever
Att'ys No. 681,489.  
W. VOSS.  
AUTOMATIC BRAKE.  
(Application filed Feb. 23, 1901.)  
(No Model.)

Patented Aug. 27, 1901.

2 Sheets—Sheet 2.

Witnesses:  
Chas. E. Gaylord  
Lute J. Alter

Inventor:  
William Voss,  
By Dwight B. Cheever  
Atty.

THE NORRIS PETERS CO., PHOTO-LITHO., WASHINGTON, D. C.

UNITED STATES PATENT OFFICE.

WILLIAM VOSS, OF HARVEY, ILLINOIS, ASSIGNOR TO WHITING FOUNDRY EQUIPMENT CO., OF SAME PLACE.

AUTOMATIC BRAKE.

SPECIFICATION forming part of Letters Patent No. 681,489, dated August 27, 1901.

Application filed February 23, 1901. Serial No. 48,486. (No model.)

*To all whom it may concern:*

Be it known that I, WILLIAM VOSS, a citizen of the United States, residing at Harvey, in the county of Cook and State of Illinois, have invented a new and useful Improvement in Automatic Brakes, of which the following is a specification in its best form now known to me, reference being had to the accompanying drawings, in which similar figures indicate the same parts throughout the several views.

My invention relates to automatic brakes, and particularly to brakes for use in cranes and other hoisting apparatus.

The object of my invention is make a brake which shall be practically noiseless and be very positive in action, thereby doing away with danger of injury to the load and to the brake.

My invention consists in a brake having means, to be hereinafter described and claimed, for giving the dogs an automatic positive action when it is desired to stop or lower the load and at the same time render them noiseless while the load is being raised.

Figure 5:
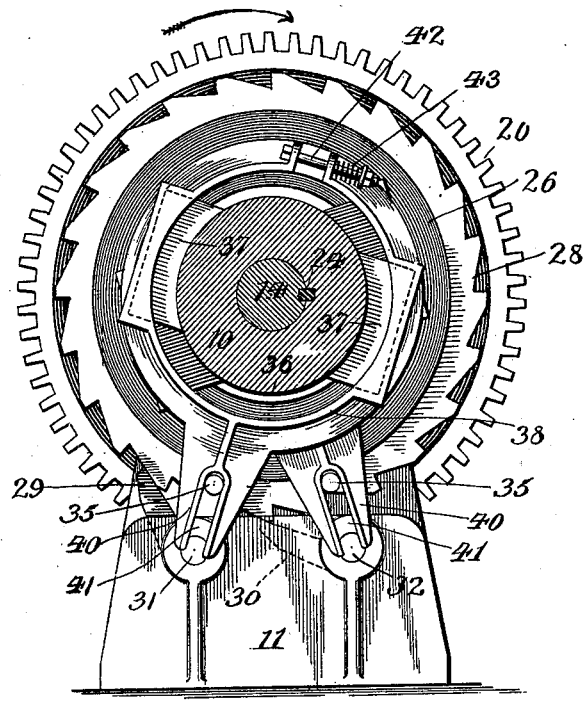
Figure 6:
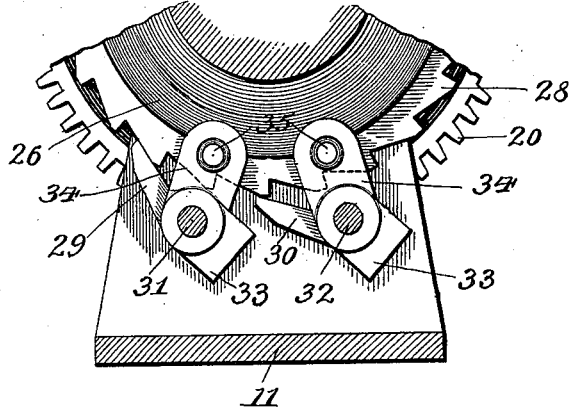

In the drawings, Figure 1 is a sectional elevation of a brake having my invention applied thereto. Fig. 2 is a sectional detail view of one sleeve and brake disk, and Fig. 3 is a front view of the other. Fig. 4 is a detail view on the line 4 of Fig. 1. Fig. 5 is an end view of my improved apparatus, and Fig. 6 is a detail view on line 5 of Fig. 1.

Rigidly secured to the main frame of the crane is the brake frame or pedestal 11, into which is fitted the brass bushing 12. The part marked 13 is a sleeve which is adapted to slide backward and forward within certain limits on the shaft 14. This sleeve has at one end a tongue 15, which fits into a notch 16 in a collar 17, secured to the end of shaft 14. This collar is fastened by a key 18 and a pin 19, so that the sleeve 13 and parts connected to it rotate with the shaft. In place of the construction shown an ordinary spline may be used. A gear-wheel 20, rigidly secured to the sleeve 13, connects through other gearing (not shown) with the load which is to be lifted. The sleeve 13 has a flange or brake-disk adapted to bear against the brake-ratchet 22 and also has a screw-thread 23 cut in its end. Rigidly secured to the opposite end of shaft 14 by means of the key 24 and the nut 24ª is another sleeve 10, having cut in it a screw-thread 25, adapted to fit over the thread 23 and having a flange or brake-disk 26, adapted to bear against the brake-ratchet 22. This sleeve or brake-disk might be made integral with the shaft and as far as the operation is concerned is a part of the shaft. As shown in Fig. 1, this brake-ratchet is carried on sleeve 13, between the flanges 21 and 26, being separated from them by vulcanite washers 27. As shown in Figs. 5 and 6, this ratchet-wheel 22 has its teeth 28 engaged by the pawls 29 and 30, pivoted at 31 and 32 to the brake-pedestal 11. These pawls are made with enlargements 33 at their lower ends, which act as weights to force the pawls into engagement with the ratchet-teeth; but it is found in practice that mere weighted pawls cannot be relied upon, particularly when the load is suddenly moved in either direction. In order to secure positive engagement of these pawls with the ratchet-teeth, I make them with a crank-arm 34, having extending from it a crank-pin 35. In the sleeve 10 I cut a groove 36, into which are fitted vulcanite friction-segments 37. These segments are arranged opposite each other and are rigidly secured in friction-rings surrounding the shaft. There are two separate rings 38 and 39 side by side, each having its own friction-segments and each operating one pawl. The ring 38 has extending from it an arm 40, having a slot or notch 41, in which the crank-pin 35 of one pawl 29 is adapted to slide. Ring 39 has a similar arm similarly connected to pawl 30. As shown, these pawls are so placed that when one pawl is near the point of a ratchet-tooth the other pawl is well inside the notch of another tooth, thereby making sure that in any given position at least one pawl will be in engagement with a tooth of the wheel. The counterweights 33 are heavy enough to keep the pawls in engagement in the usual manner if for any reason the friction-segments become loose and fail to work. The pressure of the friction-segments in the groove 36 is adjusted by tightening the bolt 42, which has upon it the compression-spring 43. This pressure is such that when the shaft and sleeve are rotated in the direction of the arrow, Fig. 5, the pawls are swung entirely out of engagement with the ratchet-teeth, and when the motion of the shaft is reversed the rings follow promptly and the pawls are thrown promptly and positively into the notches of the ratchet-wheel.

In the operation of my improved brake power is applied to the shaft 14, and a load is attached to the gearing connected with gear 20. The power-shaft is rotated in the direction indicated by the arrow, thereby moving screw-thread 25 along thread 23 until flanges 21 and 26 are locked against ratchet-wheel 22, when both ratchet-wheel 22 and gear-wheel 20 rotate with the shaft and the load is raised. When the shaft 14 and sleeve 10 began to rotate, there was just enough friction between the vulcanite pieces 37 and the groove 36 so that the arms 40 were swung to the right and the pawls 29 and 30 were dropped down out of engagement with the ratchet-teeth 28. The weight of the parts 33 is so adjusted with reference to the friction under the vulcanite pieces 37 that these counterweights cannot swing upward into the teeth 28 and cause trouble. If it is desired, a block or stop may be placed upon the pedestal, so as to limit the upward motion of these counterweights. When the power is stopped, the load on the wheel 20 causes the shaft to start to move in the opposite direction; but vulcanite segments 37 tend to bind in the groove 36, which moves arms 40 to the left, thereby instantly and positively throwing pawls 29 and 30 into engagement with the ratchet-teeth 28. This locks the wheel 22, and consequently the load. As long as the shaft remains at rest or moves or tends to move to the left the pawls will remain locked in the teeth of the ratchet-wheel, and it must remain at rest. When it is desired to lower the load, the power is applied to shaft 14, and it is rotated to the left in the direction opposite to the arrow. This movement of the shaft causes screw-thread 25 to move off from thread 23 and the flange 26 to be moved away from the now stationary ratchet-wheel 22, thereby releasing the load, which under action of gravity causes the flange 21 to try to follow flange 26. The load thus descends just as long and as fast as the shaft and sleeve 10 are moved to the left by the power. When the power is stopped, the flange 26 comes to rest. The load drives screw-thread 23 into thread 25 until flange 21 is forced against the ratchet-wheel 22, (still stationary,) thereby stopping and locking the load.

My improved apparatus just described has the distinct and very valuable advantage over other brakes of doing away with all noise or clattering of the pawls or dogs while the load is being lifted and of providing prompt and positive action by these parts when the power is stopped, thereby insuring the safety of the load, the lifting machinery, and the workmen.

The friction device for throwing in the pawls may be applied to other forms of clutch and the size, shape, and material of the various parts may be varied within wide limits without departing from my invention.

Having thus described my invention, what I claim as new, and desire to secure by Letters Patent, is—

1. In apparatus of the class described, in combination with the frame of the machine, a power-shaft, a brake-disk rigidly secured thereto, a load-carrying sleeve splined to the shaft, another brake-disk on said sleeve, a screw connection between said brake-disks, a ratchet-wheel loosely mounted between and adapted to be held by said brake-disks, a pawl adapted to engage said ratchet-wheel, a friction-ring surrounding and actuated by said shaft and engaging said pawl, the resistance of said ring being such that when the shaft is rotated in one direction the pawl is thrown out of engagement with the ratchet-wheel and when it is rotated in the opposite direction said pawl is thrown into engagement with said ratchet.

2. In apparatus of the class described, in combination with the frame of the machine, a power-shaft, a brake-disk rigidly secured thereto, a load-carrying sleeve splined to the shaft, another brake-disk on said sleeve, a screw connection between said brake-disks, a ratchet-wheel loosely mounted between and adapted to be held by said brake-disks, a pawl adapted to engage said ratchet-wheel, a ring surrounding and actuated by said shaft and having an arm engaging said pawls, the resistance of said ring being such that when the shaft is rotated in one direction the pawl is thrown out of engagement with the ratchet-wheel and when it is rotated in the opposite direction said pawl is thrown into engagement with said ratchet.

3. In apparatus of the class described, in combination with the frame of the machine, a power-shaft, a brake-disk rigidly secured thereto, a load-carrying sleeve splined to the shaft, another brake-disk on said sleeve, a screw connection between said brake-disks, a ratchet-wheel loosely mounted between and adapted to be held by said brake-disks, a pawl adapted to engage said ratchet-wheel, a ring surrounding and actuated by said shaft and having an arm engaging said pawl, and means on said ring for adjusting the pressure of said ring about the shaft, substantially as described.

WILLIAM VOSS.

Witnesses:
C. H. APPLEGATE,
C. H. IRWIN.